US008016595B2

(12) United States Patent  
Aoki et al.

(10) Patent No.: US 8,016,595 B2
(45) Date of Patent: Sep. 13, 2011

(54) INTERACTIVE DRIVING SIMULATOR, AND METHODS OF USING SAME

(75) Inventors: Katsuhito Aoki, Saitama (JP); Sadanao Ichimi, Saitama (JP); Yukio Miyamaru, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 803 days.

(21) Appl. No.: 10/777,479

(22) Filed: Feb. 12, 2004

(65) Prior Publication Data

US 2004/0259059 A1    Dec. 23, 2004

(30) Foreign Application Priority Data

Feb. 14, 2003 (JP) .................. 2003-037489

(51) Int. Cl.  
   *G09B 9/04*  (2006.01)
(52) U.S. Cl. ....................................... 434/61
(58) Field of Classification Search .......... 434/61  
   See application file for complete search history.

(56) References Cited

U.S. PATENT DOCUMENTS

| 3,577,857 | A | * | 5/1971 | Schuster et al. | 434/69 |
| 4,459,114 | A | * | 7/1984 | Barwick | 434/307 R |
| 5,131,848 | A | * | 7/1992 | Adams | 434/69 |
| 5,415,550 | A | * | 5/1995 | Aoki et al. | 434/61 |
| 5,474,453 | A | * | 12/1995 | Copperman | 434/29 |
| 5,547,382 | A | * | 8/1996 | Yamasaki et al. | 434/61 |
| 5,660,547 | A | * | 8/1997 | Copperman | 434/29 |
| 6,010,403 | A | * | 1/2000 | Adam et al. | 463/6 |
| 6,146,143 | A | * | 11/2000 | Huston et al. | 434/69 |
| 6,200,138 | B1 | * | 3/2001 | Ando et al. | 434/61 |
| 6,311,041 | B1 | * | 10/2001 | Goodyear | 434/350 |
| 6,471,586 | B1 | * | 10/2002 | Aiki et al. | 463/6 |
| 6,561,952 | B2 | * | 5/2003 | Wu | 482/3 |
| 2003/0033161 | A1 | * | 2/2003 | Walker et al. | 705/1 |
| 2003/0096647 | A1 | * | 5/2003 | Ouchi | 463/30 |
| 2003/0216161 | A1 | * | 11/2003 | Busse et al. | 463/6 |
| 2004/0009812 | A1 | * | 1/2004 | Scott et al. | 463/28 |

FOREIGN PATENT DOCUMENTS

| JP | 02043591 A | * | 2/1990 |
| JP | 10-097179 |  | 4/1998 |
| JP | 2002297017 A | * | 10/2002 |

* cited by examiner

*Primary Examiner* — Kesha Y. Frisby  
(74) *Attorney, Agent, or Firm* — Carrier Blackman & Associates, P.C.; William D. Blackman; Joseph P. Carrier

(57) ABSTRACT

In an interactive driving simulation apparatus for a two-wheeled vehicle, a real-time test drive performance by a student operator around a simulated driving route sequence is recorded. The recorded performance is later replayed for the benefit of the student, to provide real-world simulation, education, and performance evaluation. During the simulated driving, pre-recorded performance evaluation comments are selected and stored, corresponding to the student's specific performance at a traffic driving situation on the driving route sequence. Then, upon displaying of a replay screen image of the simulated driving on a display unit, when a particular traffic driving situation is arrived at, a simulated operating environment of the traffic driving situation and the selected performance evaluation comments are automatically superimposed and displayed together as a replay screen 154.

15 Claims, 14 Drawing Sheets

FIG. 7

33ms
$h = (h \times 9 + th \times 0.1) / 10$
$\beta = (\beta \times 9 + \alpha s \times 3.0) / 10$ Decision of eye point position $Xe = Xm + d \times \sin(\beta + \psi m)$
$Ye = Ym + d \times \cos(\beta + \psi m)$
$\psi e = \psi m + \beta$
$Ze = Zm + h0$
$\rho e = -\tan^{-1}(h0/d)$

Fig. 8

| Scene | Result | Situation |
|---|---|---|
| 131 | Safe | You have ridden safely giving priority to a crossing pedestrian. Ride slowly paying sufficient attention to a crossing pedestrian who is liable to fail to notice you. |
| 132 | Safe | You have ridden safely with respect to a vehicle pulling out from a side road. Always check the safety when crossing in the blind spot of a parking vehicle. |
| 133 | Caution | You have closed to within 2.5 meters of a vehicle having stopped suddenly at a destination requiring a left turn. Ride very slowly when turning left or right at a blind corner/crossing. |
| 134 | Caution | You have closed to within 3 meters of a vehicle running in the opposite direction and trying to turn to the right. Sufficiently slow down your speed at a crossing having many blind spots and confirm the safety before continuing. |
| 135 | Caution | Did you notice the approaching two-wheeled vehicle driving in the opposite direction and coming out from behind a truck? Recognize the presence of a side passing vehicle and confirm the safety before turning. |
| 136 | Caution | You have closed to within 1 meter to an open door of a stopped truck. Stop behind the truck and then start after the vehicles running in the opposite direction pass. |
| 137 | Accident | A crash accident with a vehicle/pedestrian has occurred. |
| 138 | Caution | You have ridden at 74 km/h on a road whose speed limit is 40 km/h. Ride at a moderate speed paying attention to dangers around you. | ns

INTERACTIVE DRIVING SIMULATOR, AND METHODS OF USING SAME

CROSS-REFERENCE TO RELATED APPLICATION

The present invention claims priority under 35 USC 119, based on Japanese patent application No. 2003-037489, filed Feb. 14, 2003.

BACKGROUND OF THE INVENTION

1. Field of the Invention

The present invention relates to an interactive driving simulation apparatus for displaying a screen image of a virtual world on a display unit, while an operator moves manual controls to simulate driving a two-wheeled vehicle, and to methods of using the described apparatus. More particularly, the present invention relates to an interactive driving simulation apparatus which allows a student operator to take a driving simulation test which monitors inputs from the operator during the test, which records the operator's inputs during the test, and which can subsequently provide performance evaluation comments to the operator in conjunction with playing back a recorded screen image, after the real-time simulation comes to an end. The invention also relates to methods of using the described simulation apparatus to train an operator.

2. Description of the Background Art

Conventionally, driving simulation apparatus have been known wherein, when an operator performs various functions on a simulated two-wheeled vehicle, various driving conditions or situations are displayed on a display unit, to allow the operator to simulate actual driving states which would be encountered on a two-wheeled vehicle. These types of simulators have been adopted for use in driver's education and training related to two-wheeled vehicles (refer to, for example, to Japanese Laid-Open Patent No. 2002-297017 (paragraphs [0019] to [0021], [0034], to [0051], [0064], FIG. 1). A depiction of one prior art apparatus is included in the present application as FIG. 14, for discussion purposes.

As shown in FIG. 14, a driving simulation apparatus 2 of the type disclosed in Japanese Patent Laid-Open No. 2002-297017 includes a control mechanism 6 installed on a floor face 4, and a motion unit section 10 removably connected to the control mechanism 6 by a connection mechanism 8. The illustrated prior art driving simulation apparatus 2 further includes an instructor's apparatus 14, including a personal computer or the like, connected to the control mechanism 6 through a communication line 12, for use by a teacher or instructor.

The control mechanism 6 includes a body section 20 in which the control circuit 16 and a CGI (computer generated image) apparatus 18 are accommodated, and a display box 24 provided above the body section 20 and having a display unit 22, of the projection type, accommodated therein. A display apparatus 26 is formed from the display unit 22 and the CGI apparatus 18.

The motion unit section 10 includes a base 28. The base 28 has mounted thereon a simulated two-wheeled vehicle 32, which can be steered by an operator 30, and a drive mechanism 34 which drives the simulated two-wheeled vehicle 32 in conformity with movements of an actual two-wheeled vehicle.

The drive mechanism 34 includes a steering motor 38 for providing reactive force to a rotating operation of a handle bar 36 of the operator 30, a pitch motor 40 for providing reactive force in a pitching direction in response to an operation of a brake lever, and a roll motor 42 for providing reactive force to a movement of the weight of the operator in a rolling direction. Output signals from the simulated two-wheeled vehicle 32 such as an output signal of the steering motor 38 are transmitted to the control circuit 16.

In using the prior art driving simulation apparatus 2 having the configuration described above, various operations are performed by the operator 30, such as an operation of the handle bar 36 and an operation of a throttle grip 44. When each such operation is performed, current behavior information data of the simulated two-wheeled vehicle 32 are supplied, on a real-time basis, from the control circuit 16 to the CGI apparatus 18. In response to the behavior information data, a screen image of a driving route is displayed on the display unit 22, including screen images of the simulated two-wheeled vehicle, a surrounding landscape and other vehicles based on the driving state of the simulated two-wheeled vehicle 32.

In other words, a screen image of a so-called simulation (simulated driving) situation is displayed on the display unit 22 in real time. Consequently, the operator 30 can have a simulated driving experience, which approximates a real driving experience of an actual vehicle.

The screen image of the simulation situation experienced by the student is also similarly displayed on a monitor 45 of the instructor apparatus 14. During the simulation sequence, data representative of the screen image of the simulation situation are stored in detail in the memory of the instructor apparatus 14, in a sequential time series.

The screen image data of the simulation situation stored in the memory of the instructor apparatus 14 can be reproduced, that is, replayed, on the screens of the display unit 22 and the instructor's monitor 45. Upon such reproduction, an instructor 46 can operate a mouse 48 or a touch panel on the monitor 45, to suitably stop the reproduction screen, vary the position of the vantage point of the bird's eye view, or perform some other operation to give guidance to the student operator 30, as part of the teaching process.

However, with the apparatus disclosed in Japanese Patent Laid-Open No. 2002-297017 specified above, since the instructor apparatus 14 is required in addition to the student apparatus, the fabrication cost to make the apparatus is comparatively high. Further, since a human instructor who gives guidance is also required, the related labor cost to operate the apparatus is increased.

Although the known driving simulators have utility for their intended purposes, a need still exists in the art for an improved driving simulation apparatus, wherein a simulated operating environment is displayed as a screen image on a display unit, based on a driving operation of a simulated vehicle by a student operator, so that the student operator can simulate driving a two-wheeled vehicle. In particular, there is a need for an improved driving simulation apparatus which can record a particular test sequence, and which can efficiently guide the student operator, upon reproduction of a recorded screen image, after the real-time simulation comes to an end.

SUMMARY OF THE INVENTION

The present invention has been made taking the above-described background into consideration, and it is an object of the present invention to provide an interactive driving simulation apparatus which can eliminate the necessity for a separate monitoring apparatus for the instructor.

It is another object of the present invention to provide an interactive driving simulation apparatus which can be used by a student operator even if a human instructor is absent or unavailable.

It is a further object of the present invention to provide an interactive driving simulation apparatus which can reduce the time required for operator education.

The present invention provides an interactive driving simulation apparatus, wherein a virtual world is displayed as a screen image on a display unit, based on a driving operation of a simulated vehicle by a student operator, to allow the operator to simulate driving a two-wheeled vehicle in a driving situation. During use of the driving simulation apparatus hereof, a student operator's specific performance is recorded, and the student's performance is able to be reproduced later on the display unit, after the simulation comes to an end.

The apparatus is capable of providing performance evaluation comments on the student's performance, without requiring input from an instructor. The apparatus hereof includes a selector for selecting a performance evaluation commentary from a stored plurality of phrases, to constructively comment on the student's simulated driving, at an appropriate scene determined in advance in a running route upon the simulation.

The apparatus hereof also includes a display apparatus for displaying the simulated operating environment and the performance evaluation commentary simultaneously when the driving situation occurs on the display unit during playback of the student's recorded performance.

According to the present invention, upon simulation, after a performance evaluation commentary is selected from a driving test result at a driving situation determined in advance in a driving route, when the driving situation is reproduced on the display unit during playback, a simulated operating environment and the performance evaluation comments are superimposed and displayed simultaneously. Consequently, the operator can confirm the performance evaluation commentary and the relevant screen image of the particular driving situation simultaneously. Consequently, understanding of the operator is improved, and the student operator is able to learn more efficiently.

In this instance, where the means for selecting a performance evaluation commentary selects only a scene at which an unsafe action was performed from within the driving simulation, and the simulated operating environment and the performance evaluation commentary displays simultaneously only for the scene(s) at which the unsafe action was performed, the operator observes only the scene(s) at which guidance is required. Consequently, the time required for review and commentary can be reduced.

Further, where the driving simulation apparatus further includes means for reading the performance evaluation commentary aloud upon reproduction on the display unit, the student's understanding is further facilitated.

Furthermore, where the playback is temporarily paused and a still screen image is displayed with the simulated operating environment and the performance evaluation commentary displayed simultaneously, the operator can correlate the driving situation screen image and the guidance performance evaluation commentary with a higher degree of certainty.

Further, where, upon reproduction, the driving situation screen image is played back at the normal reproduction speed or by a temporarily paused still-screen image, and the screen image other than the driving situation screen image is reproduced by fast-feeding reproduction or by skipping reproduction, the driving situation screen images can be confirmed in a concentrated manner in a short period of time.

It is to be noted that, upon fast-feeding reproduction, the fast-feeding speed is not limited to a fixed speed, but otherwise, for example, the fast-feeding speed during stopping of the vehicle can be set to a higher speed in response to the driving situation.

BRIEF DESCRIPTION OF THE DRAWINGS

FIG. 7 is a view showing a manner of determining a vantage point.

FIG. 8 is a view illustrating a table representative of results of simulated student driving on driving situations.

DETAILED DESCRIPTION

Figure 1:
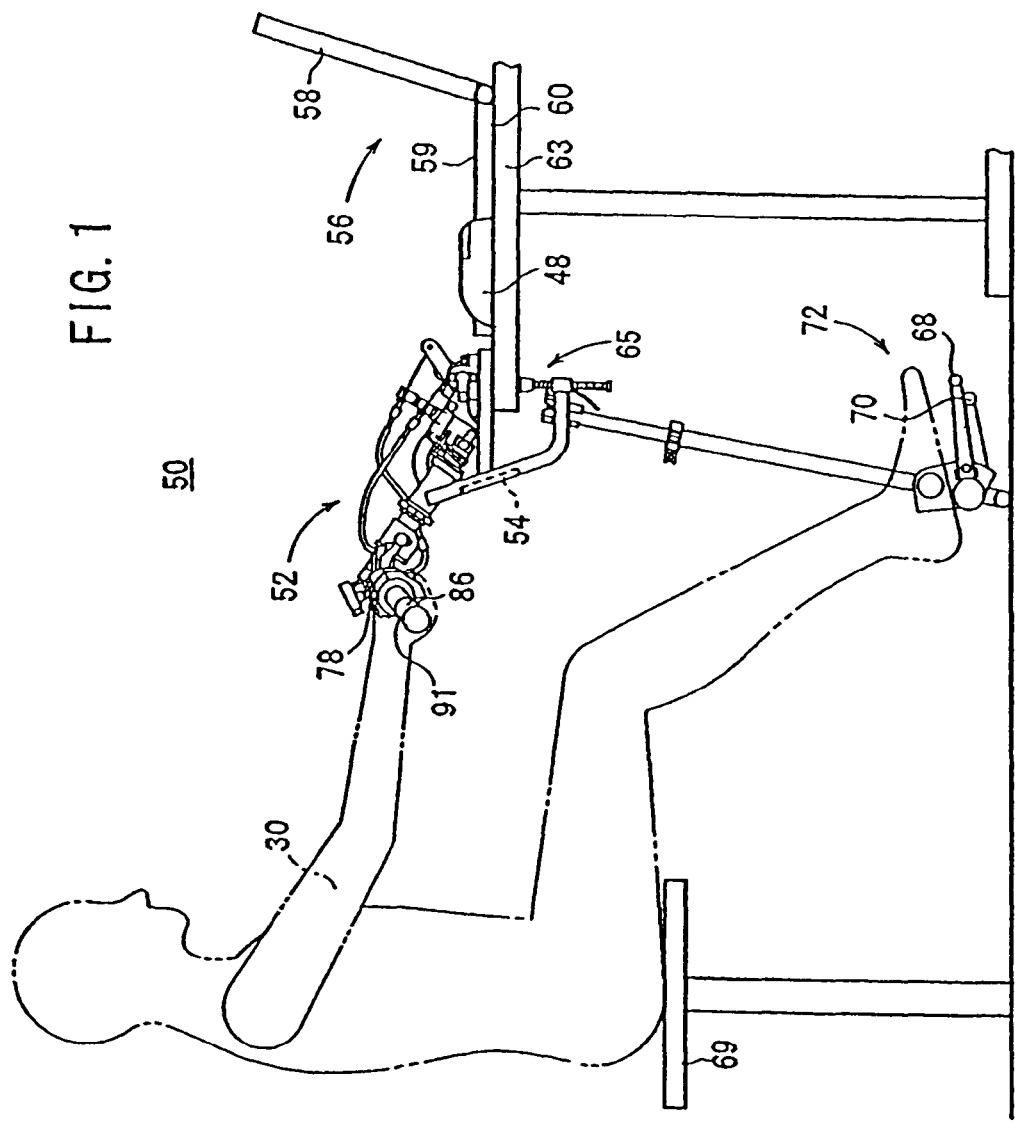
FIG. 1 is a side plan view of an interactive driving simulation apparatus 50 according to a selected illustrative embodiment of the present invention.

As shown in FIG. 1, an interactive driving simulation apparatus 50, according to an illustrative embodiment of the present invention, includes a simulated vehicle 52 for operation by an operator 30 sitting on a seat 69, and a control apparatus 56 such as a personal computer (PC) electronically connected to an interface board 54 of the simulated vehicle 52. The control apparatus 56 may be a portable computer, similar to that shown.

The control apparatus 56 includes a display unit 58, which may include a liquid crystal display screen. The control apparatus 56 also includes a mouse 48 and a keyboard 59 serving as input apparatus, and an apparatus case 60.

Figure 2:
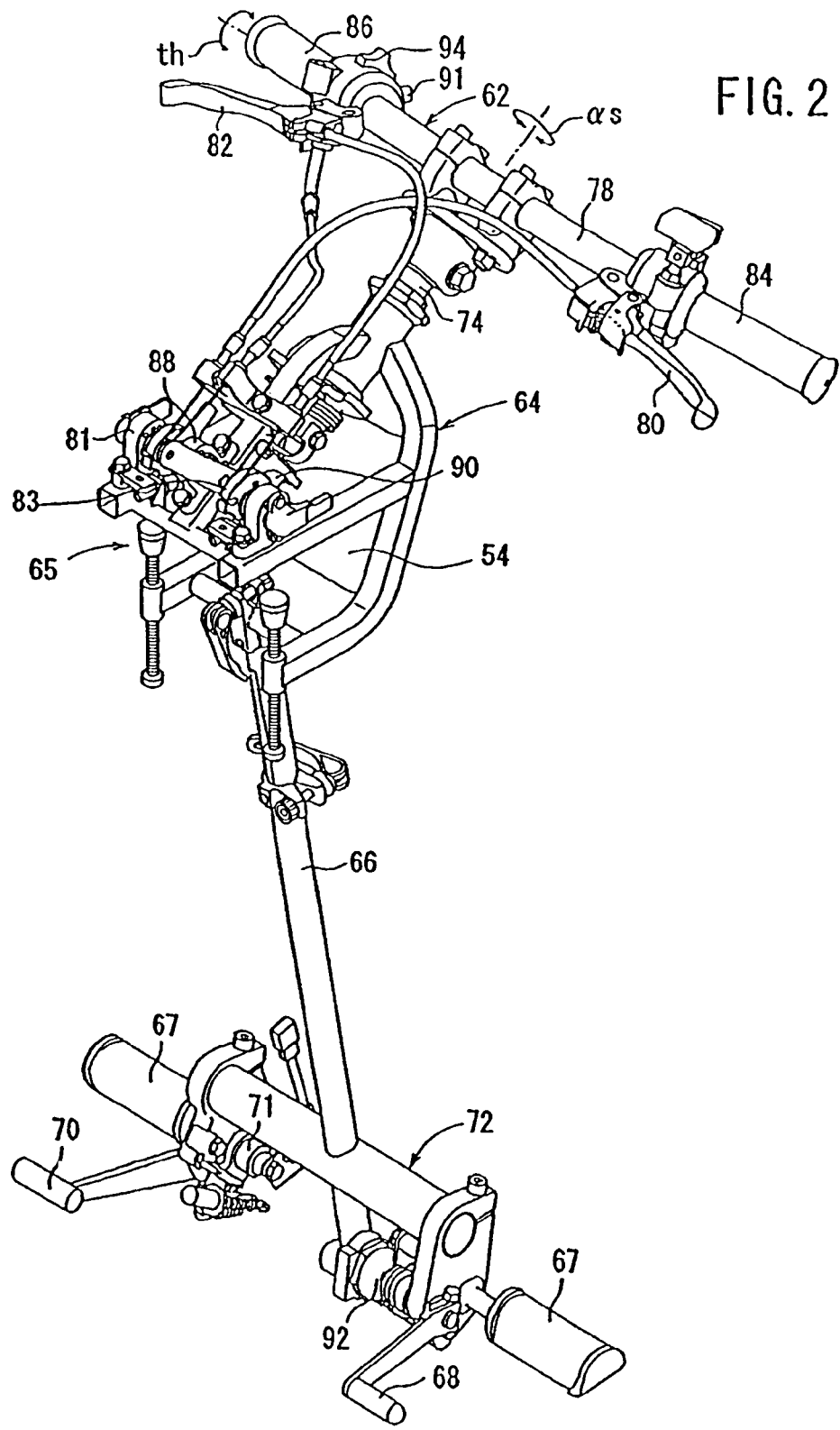
FIG. 2 is a perspective view of a simulated vehicle 52 which constitutes part of the driving simulation apparatus 50 of FIG. 1.

As shown in FIG. 2, the simulated vehicle 52 includes a handle bar mechanism 62, a support frame 64, a connection shaft 66, and a step mechanism (pedal mechanism) 72. The handle bar mechanism 62 is provided to be gripped by the hands of the operator 30, and is used for steering the front wheel of a virtual two-wheeled vehicle displayed on the display unit 58. The support frame 64 supports the handle bar mechanism 62 thereon for rotation through a predetermined angular range. The connection shaft 66 is mounted for tilting motion and compression and expansion motion on the support frame 64. The step mechanism (pedal mechanism) 72 is disposed at a lower end portion of the connection shaft 66, and includes a pair of foot rests 67, as well as a gear change pedal 68 and a rear brake pedal 70.

The simulated vehicle 52 is mounted on, and used together with a table 63 via a mounting mechanism 65, as shown in FIG. 1. The control apparatus 56, connected to the interface board 54 of the simulated vehicle 52 by an electric cable, is placed on the table 63, and is situated where the operator 30 can beneficially observe the display unit 58.

Referring again to FIG. 2, the handle bar mechanism 62, which constitutes a component of the simulated vehicle 52, includes a steering stem 74, a steering handle bar 78, a clutch lever 80 and a front brake lever 82. The handle bar mechanism 62 also includes a left handgrip 84, a throttle grip 86, a lighting control switch 94 and a starter switch 91. The steering handle bar 78 is integrally held on the steering stem 74 via a connecting mechanism.

The clutch lever 80 and the front brake lever 82 are each adapted to be hand-operated, and are pivotally mounted on opposite ends of the steering handle bar 78. The left handgrip 84 and the throttle grip 86 are pivotally mounted on to the respective opposite end portions of the steering handle bar 78, as shown, with the clutch lever 80 located in front of the left handgrip 84, and the front brake lever 82 in front of the throttle grip 86. The lighting control switch 94 and the starter switch 91 are disposed on the right side of the handle bar 78.

Here, the throttle grip 86 is used to provide an acceleration input to the virtual simulated two-wheeled vehicle displayed on the display unit 58, in response to a throttle opening TH obtained when the operator 30 pivotally moves the top of the throttle grip 86 in a direction toward the operator 30.

On the other hand, upon replay and review of a recorded driving route sequence, the throttle grip 86 may be used to adjust the zoom angle (depression angle) in the upward or downward direction of the vantage point of the bird's eye view of an image displayed on the display unit 58.

Further, upon replay and review of a recorded driving route sequence, by a pivoting operation of the steering handle bar 78, the handle bar angle αs adjusts the angle (rotational angle) in a horizontal direction of the vantage point of the bird's eye view.

Furthermore, upon replay and review of a recorded driving route sequence, the gear change pedal 68 is used to adjust the depression angle of the vantage point of the bird's eye view of the image.

It is to be noted that, upon replay and review of a recorded driving route sequence, the starter switch 91, which functions as screen image still stopping means, can be used for changeover between forward feeding (normal replay) and reverse feeding (reverse replay), and also between normal play speed and temporary pause (still-screen image reproduction).

The operation amount of the throttle grip 86 (throttle opening TH) is detected by a throttle opening sensor 88 in the form of a potentiometer, and the handle bar angle αs of the steering handle bar 78 is detected by a handle bar angle sensor 90 in the form of a potentiometer. Meanwhile, the operation position of the starter switch 91 is detected by the starter switch 91 itself, and the position of the gear change pedal 68 is detected by a gear position switch 92. The throttle opening sensor 88, handle bar angle sensor 90, starter switch 91 and gear position switch 92 are each respectively connected to the interface board 54.

Further, the operation angle of the clutch lever 80 is detected by a clutch lever angle sensor 81 in the form of a potentiometer. The grasping power of the front brake lever 82 is detected by a front brake pressure sensor 83 in the form of a potentiometer.

When the operator 30 grasps the front brake lever 82 and squeezes it toward the throttle grip 86, the front brake lever 82 effectively puts the brakes on the front wheel of the virtual simulated two-wheeled vehicle displayed on the display unit 58.

Various sensors 96, such as the front brake pressure sensor 83, a rear brake pressure sensor 71 and the light control switch (dimmer switch) 94 are also connected to the interface board 54.

The front brake pressure sensor 83 operates corresponding to an operational amount of movement of the front brake lever 82. The rear brake pressure sensor 71 detects a rear brake pressure corresponding to an operation amount of the rear brake pedal 70. The light control switch (dimmer switch) 94 detects the position of a headlamp (an off position, a high beam position and a low beam position).

The light control switch 94 is used, upon replay and review of a recorded driving route sequence, as a changeover switch to choose between pausing the screen image, fast forwarding the screen image, or playing the recorded lesson at a normal speed.

It is to be noted that the reactive force acting upon each of the steering handle bar 78 which forms the handle bar mechanism 62 of the simulated vehicle 52, gear change pedal 68, rear brake pedal 70, clutch lever 80, front brake lever 82, throttle grip 86 and so forth is provided by compressive force or tensile force of a respective spring, which is not described with a reference character applied thereto.

Figure 3:
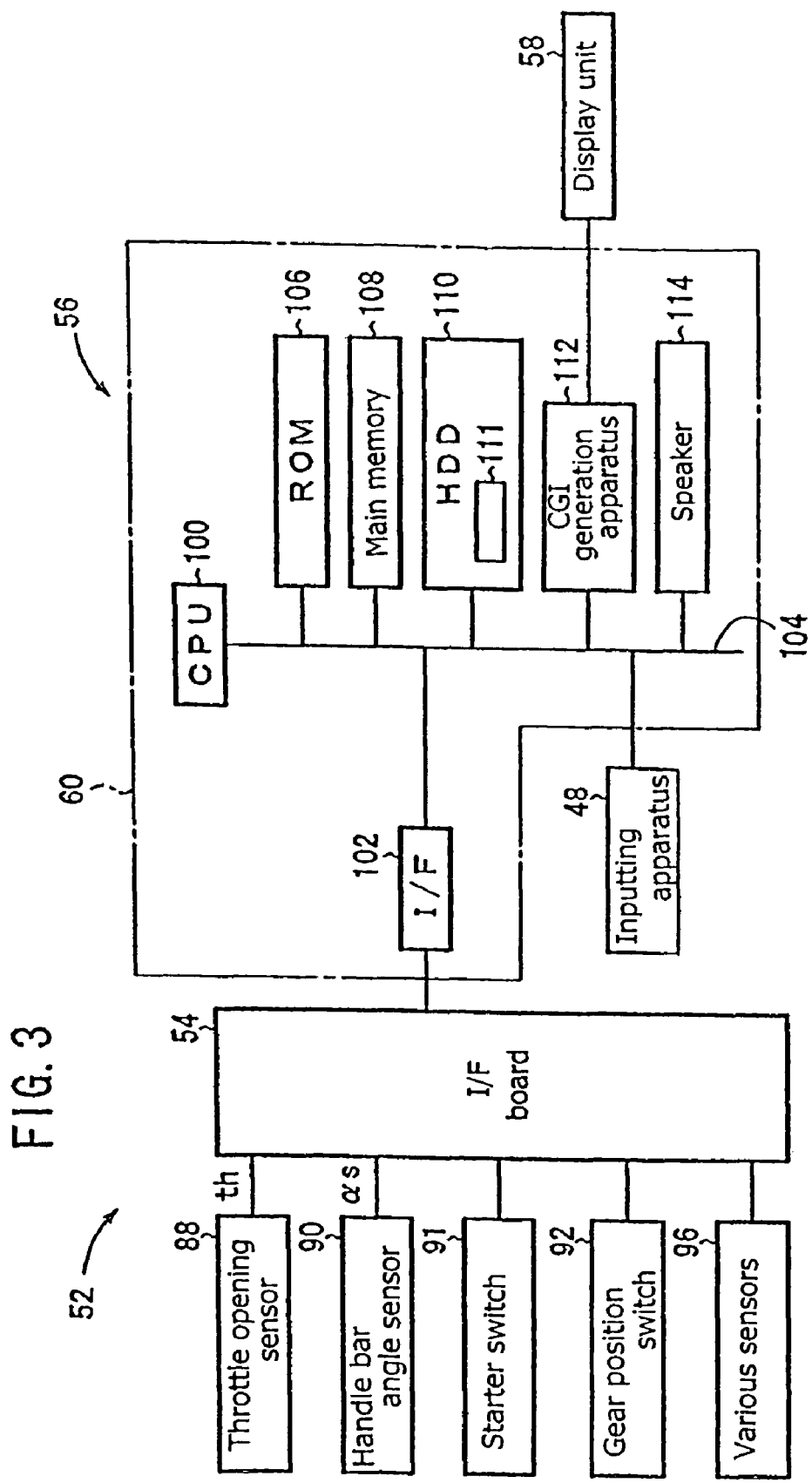
FIG. 3 is a block schematic diagram of a control circuit for the driving simulation apparatus 50 of FIG. 1.

As shown in FIG. 3, the interface board 54 and a CPU (Central Processing Unit) 100 of the control apparatus 56 are interconnected by a cable (not shown in FIGS. 1 and 2) through an interface 102 such as a USB (universal serial bus).

A ROM (read-only memory) 106 in which control programs such as an OS and so forth are stored, a main memory 108 in the form of a RAM (Random Access Memory), a hard disk drive 110, a speaker 114, and a CGI generation apparatus 112 are connected in BUS 104 of a CPU 100. The hard disk drive 110 includes a driving information storage region 111 into which driving information data upon experience and so forth are stored. The hard disk drive 110 further stores a driving simulation program for performing various processes in response to signals input from the simulated vehicle 52, data (landscape data, student operator's virtual vehicle data, performance evaluation commentaries, driving route data and so forth). The CGI generation apparatus 112 produces a bird's eye view screen image, based on an image processing result of the CPU 100, and outputs the produced bird's eye view screen image to the display unit 58.

The speaker 114 functions, during simulated driving, to generate sound effects, but functions, upon replay and review of a recorded driving route sequence, also as a sound output device for reading performance evaluation comments aloud.

Figure 4:
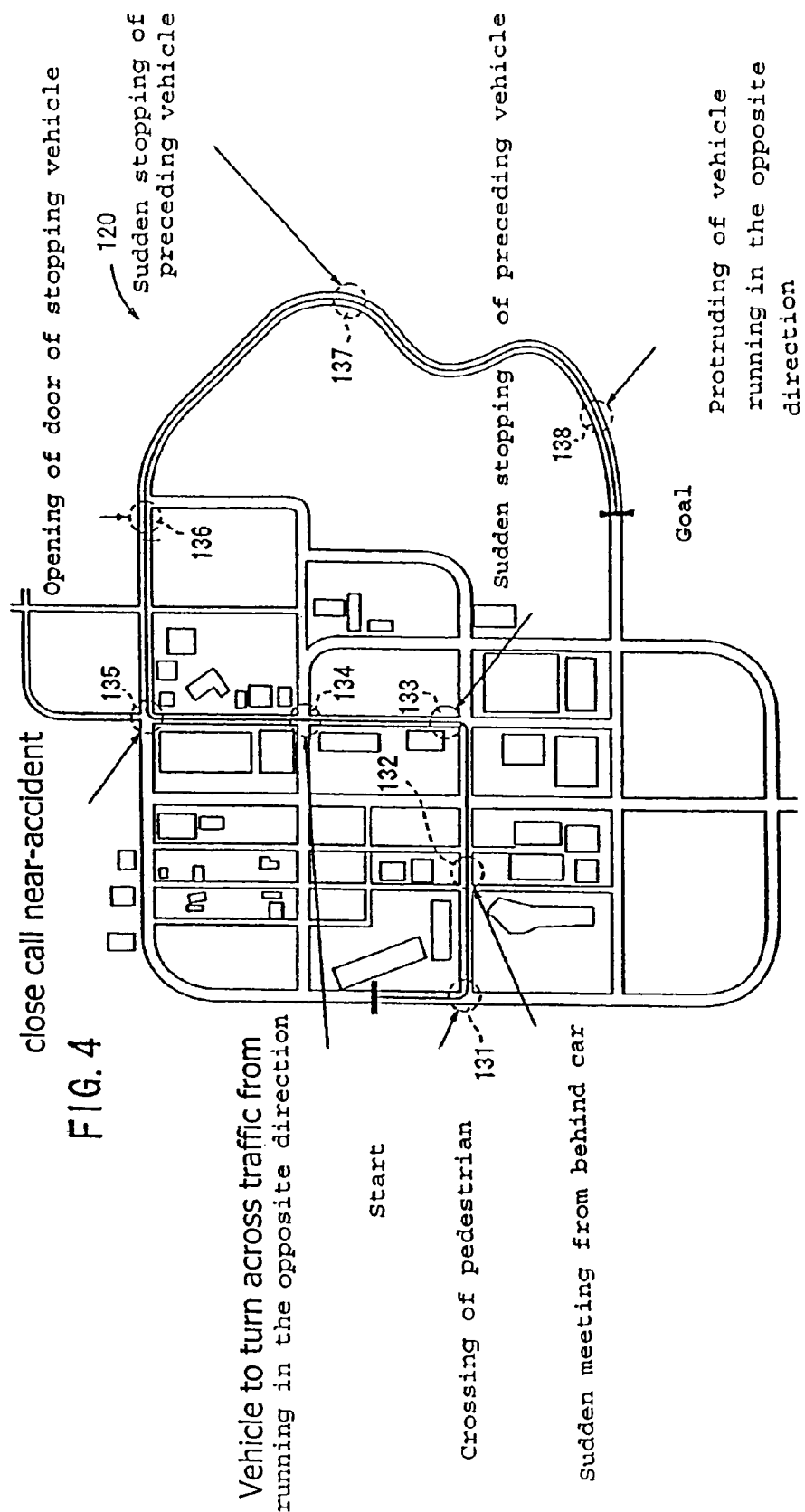
FIG. 4 is a map showing a simulated route programmed into the apparatus of FIG. 1.

FIG. 4 shows a map of a simulated virtual driving route (driving route data) 120, as an example stored in the hard disk drive 110, having a plurality of driving situations, which have been determined in advance, placed along the driving route sequence.

The driving route 120 includes eight driving situations 131 to 138 from a starting point to an end point.

The first driving situation 131, in the depicted example, is a scene simulating a pedestrian crossing in front of the virtual vehicle.

The next driving situation 132 in the example is a scene simulating a sudden encounter with a slow-moving or stationary vehicle from behind. The next driving situation 133 in the example simulates the sudden stop of a preceding car. The next driving situation 134 in the example simulates a turn of a vehicle, running in the opposite direction, in front of the virtual vehicle and across the flow of traffic. The next driving situation 135 in the example is a scene simulating a "close-call" near-accident. The next driving situation 136 in the example simulates the sudden opening of a door of a stopped vehicle. The next driving situation 137 in the example simulates another sudden stop of a preceding car. The last driving situation 138 in the example simulates a vehicle protruding into the operator's path while traveling in the opposite direction.

The production of a bird's eye view screen to be displayed on the display unit 58 by the control apparatus 56 having the CGI generation apparatus 112 will now be described with reference to FIG. 5.

Figure 6:
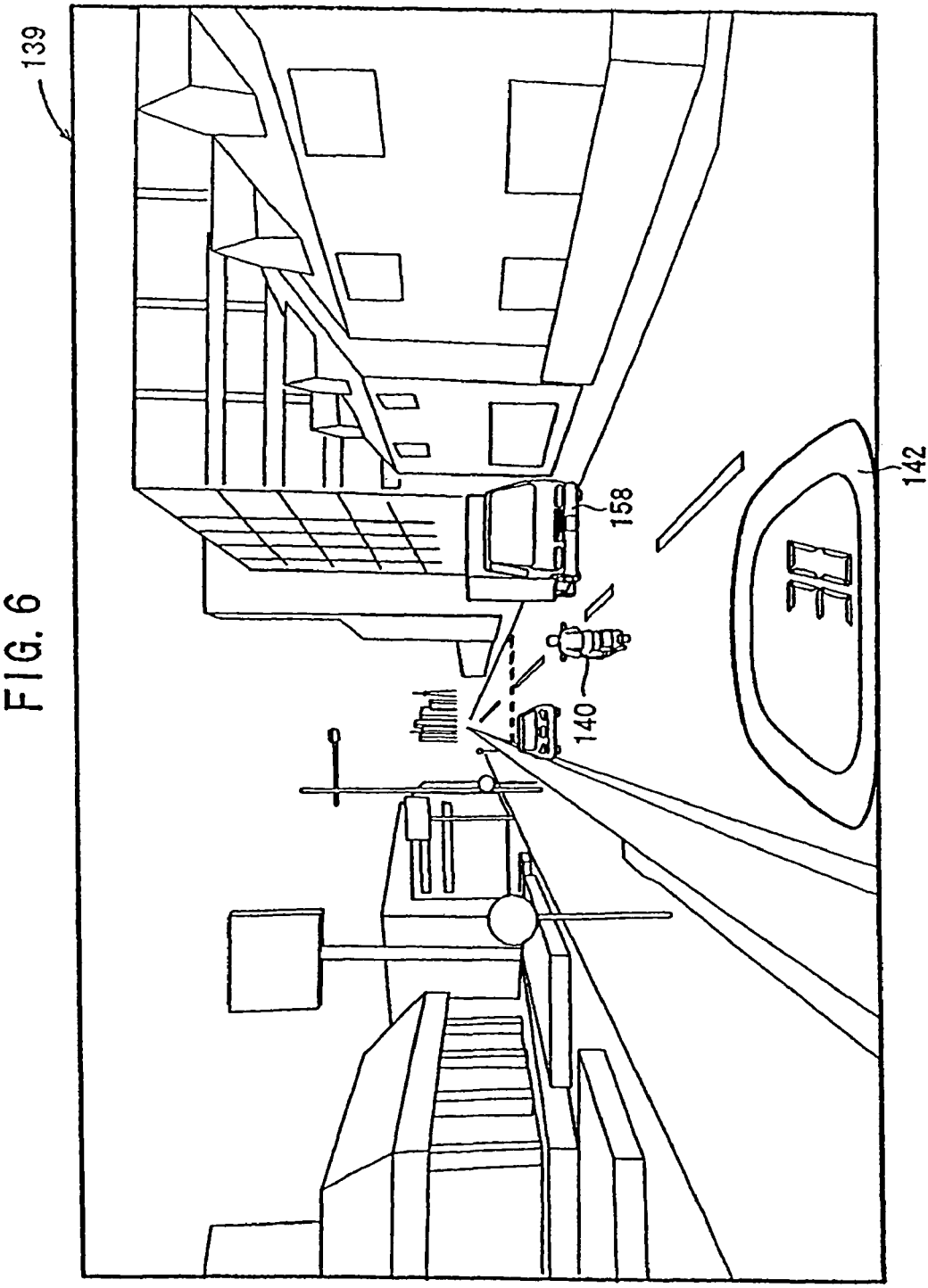
FIG. 6 is a schematic view showing an example of a bird's eye view screen image screen.

It is to be noted that FIG. 6 illustrates an example of a bird's eye view screen produced by the control apparatus 56 and the CGI generation apparatus 112. The view screen 139 is a standard screen in normal mode and also in replay mode. On the standard bird's eye view screen, a screen image of a student operator's virtual vehicle 140, as viewed at a fixed distance from an obliquely rearwardly upward position, that is, as viewed in a bird's eye view, is disposed at the center of the screen of the image of the simulated operating environment, and a screen image of an instrument panel 142 of the student operator's virtual vehicle 140 is displayed on the bottom of the display, with respect to the screen image of the student operator's virtual vehicle 140 at the center of the screen.

The numeral "30" on the instrument panel 142 denotes a driving speed. In addition to the driving speed, the operation amounts of the front and rear brakes may each be indicated as the length of a bar graph, and the gear position number where a manual transmission is used, blinker arrows as direction indicator lamps, and other similar instrumentation readouts may also be displayed on the instrument panel 142.

Figure 5:
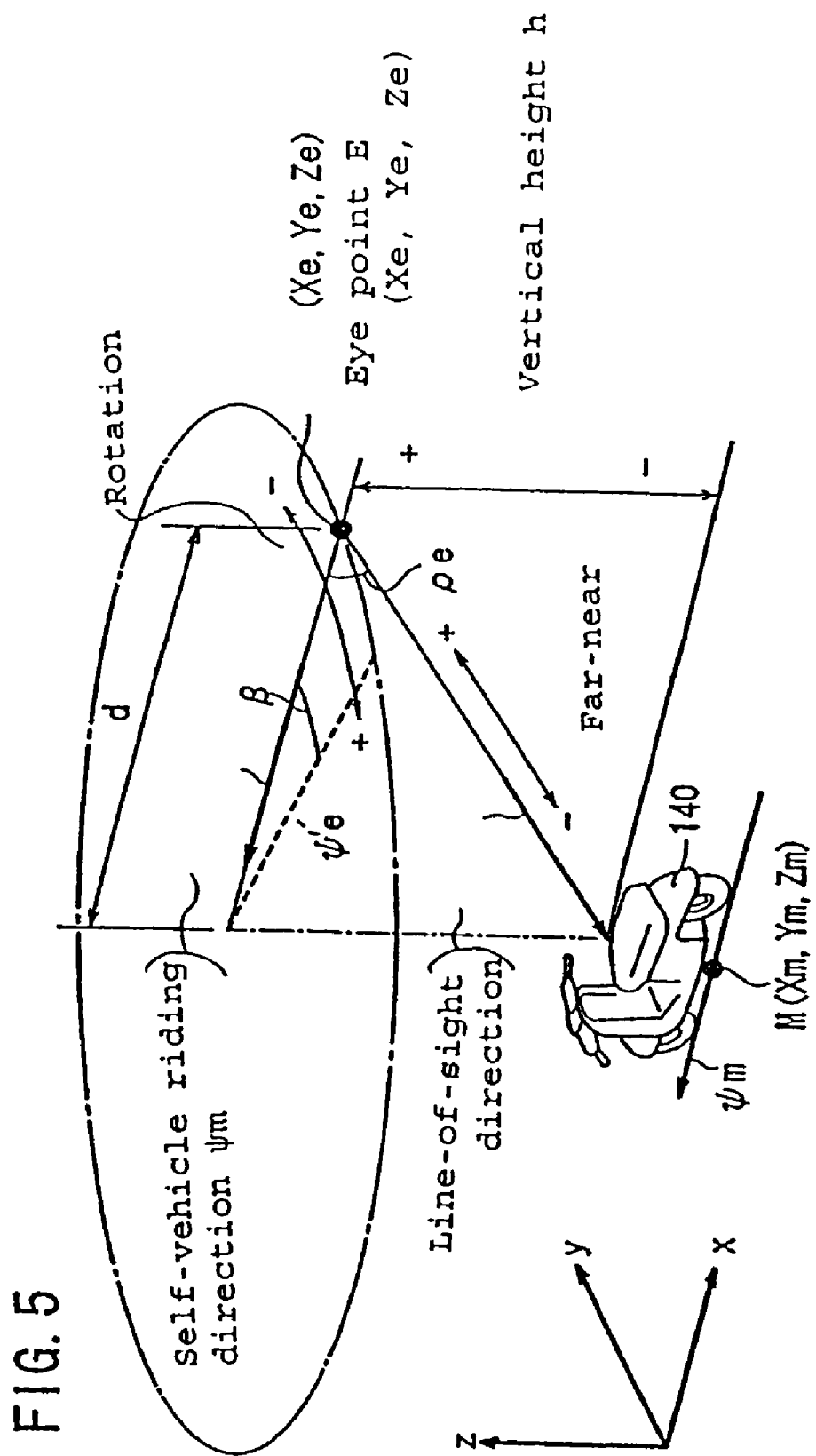
FIG. 5 is a diagrammatic view illustrating a manner of determining a vantage point when a bird's eye view screen image is produced.

Referring to FIG. 5 illustrating production of a bird's eye view screen image during replay, the three X, Y and Z axes of the rectangular coordinate system are world coordinate axes, the position M of the student operator's virtual vehicle 140 is represented by M (Xm, Ym, Zm), and the advancing direction of the student operator's virtual vehicle 140 is represented by an advancing direction ψm of the virtual vehicle 140 with respect to the X and Y axes.

Here, the manner of determining the vantage point (vantage point position, camera position) E and the depression angle (line-of-sight looking down angle) ρe is described.

On the standard screen, the depression angle ρe in the light-of-sight direction is directed toward the position at which the student operator's virtual vehicle 140 exists, such that the virtual vehicle 140 is displayed at the center of the screen, as seen in FIG. 6.

Referring to FIG. 5, reference character D denotes a horizontal distance from the student operator's virtual vehicle 140 to the vantage point E, and the horizontal distance D is decided to a fixed value of 15 meters on the standard screen upon simulated student driving and upon reproduction (upon reproduction, the throttle opening TH is set to the value 0 and the handle bar angle αs is set to 0 degrees). H (0-10 meters) denotes the height of the vantage point E, and is determined by multiplying the throttle opening TH (0-100 percent) by a coefficient (in the present embodiment, 0.1). β (±90 degrees) denotes a rotational angle around the Z-axis from the advancing direction ψm of the student operator's virtual vehicle 140, and is determined by multiplying the handle bar angle αs (±30 degrees) by a coefficient. The initial values are H=H0 (H0 is a minimum value of the vantage point height H described below) and β=0.

Then, for each 33 milliseconds, the throttle opening TH and the handle bar angle αs are sampled, and an arithmetic operation illustrated in a flow of FIG. 7 is performed to determine the vantage point E and the depression angle ρe. Then, perspective projection conversion on a screen (coordinates) not shown having a normal to the line-of-sight direction (refer to FIG. 5) and the image display on the display unit 58 is updated.

In particular, the vantage point height H and the rotational angle β are first determined in accordance with expressions (1) and (2), below.

Then, the X coordinate Xe of the vantage point E is determined in accordance with an expression (3); the Y coordinate Ye with an expression (4); the angle ψe of the line of sight around the Z axis with an expression (5); the Z coordinate Ze with an expression (6); and the depression angle ρe with an expression (7). It is to be noted that, in the present embodiment, the minimum value h0 of the vantage point height h in the expression (6) is set to H0=1.3 meters, so that the vantage point may not drop farther than that level.

$$H=(H\times9+TH\times0.1)/10 \tag{1}$$

$$\beta=(\beta\times9+\alpha s\times3.0)/10 \tag{2}$$

$$Xe=Xm+D\times\sin(\beta+\psi m) \tag{3}$$

$$Ye=Ym+D\times\cos(\beta+\psi m) \tag{4}$$

$$\psi e=\psi m+\beta \tag{5}$$

$$Ze=Zm+h0 \tag{6}$$

$$\rho e=-\tan^{-1}(H0/D) \tag{7}$$

The driving simulation apparatus 50 of the present embodiment is basically configured in such a manner as described above, and now, description is given in order of:

A. General operation upon real-time simulated student driving operation; and

B. Replay and review of recorded operation.

A. General Operation Upon Real-Time Simulated Student Driving Operation.

After the power supply to the control apparatus 56 is made available, and a driving route 120 is selected on an initial screen (not shown) on the display unit 58, real-time simulated student driving operation (simulated driving operation) by the operator 30 is performed.

During real-time simulated student driving operation, when the operator 30 operates the throttle grip 86, front brake lever 82 or clutch lever 80, output signals of the throttle opening sensor 88, front brake pressure sensor 83 and clutch lever angle sensor 81 are fed into the CPU 100 of the control apparatus 56 through the interface board 54.

On the other hand, when the operator 30 operates the rear brake pedal 70, an output signal of the rear brake pressure sensor 71 is similarly fed into the CPU 100 of the control apparatus 56. Further, in response to an operation of the gear change pedal 68 performed together with the operation of the clutch lever 80, gear position information of the gear position switch 92 is similarly fed into the CPU 100.

When various operations are performed by the operator 30 in this manner, the CPU 100 arithmetically operates a driving state of the student operator's virtual vehicle 140 on a real-time basis, based on the data fetched from the various sensors 88, 90, 92 and 96. The CPU 100 also controls the display unit 58 to display a screen image of the student operator's virtual vehicle 140, based on the driving state, together with a screen image of a landscape (buildings and driving road) and a screen image of other vehicles. Further, the CPU 100 controls the speaker 114 to generate sounds corresponding to the image display.

In this manner, under normal driving operation (upon simulated real-time driving operation), the operator 30 can have a driving simulation approximately similar to that experienced during driving of an actual two-wheeled vehicle.

It is to be noted that a student operator simulated driving result table 150 (refer to FIG. 8) is stored, in a time series for each 33 milliseconds, in the driving information storage region 111 of the hard disk drive 110 through the main memory 108. The student operator simulated driving result table 150 stores the position of the student operator's virtual vehicle 140, the positions of the other vehicles, the condition of a traffic signal and the driving situation number all used as basic information for generating a screen image and sound during normal driving operation, and a driving situation result obtained in connection with the basic information. The student operator simulated driving result table 150 further stores a performance evaluation commentary, selected based on the student's specific performance in the simulated driving operation {a state of whether the student operator's virtual vehicle 140 is driven safely or driven unsafely, and further of whether or not a simulated accident occurs}.

FIG. 8 illustrates the student operator simulated driving result table 150, regarding the driving route 120. In the student operator simulated driving result table 150, for example, where the student's simulated driving performance result in the driving situation 132 is "safe", a sentence "You have ridden safely with respect to a vehicle jumping out from a right side road. Always check the safety when crossing in the blind spot of a parking vehicle." is selected as a performance evaluation commentary. It is to be noted that different sentences are stored on the hard disk drive 110 in advance, corresponding to "safe" (safe driving result), "caution" (unsafe driving result) and "accident" (unsafe driving result) of the student's simulated driving performance. For example, if the student performance result is "caution", corresponding to an unsafe driving result, a sentence "You have operated the brake rather strongly in response to a vehicle jumping out from a right side road. Always check the safety when crossing in the blind spot of a parking vehicle. Please foresee a dangerous situation and try to drive so as not to necessitate sudden braking." is selected.

B. Replay and Review of Recorded Operation

Figure 9:
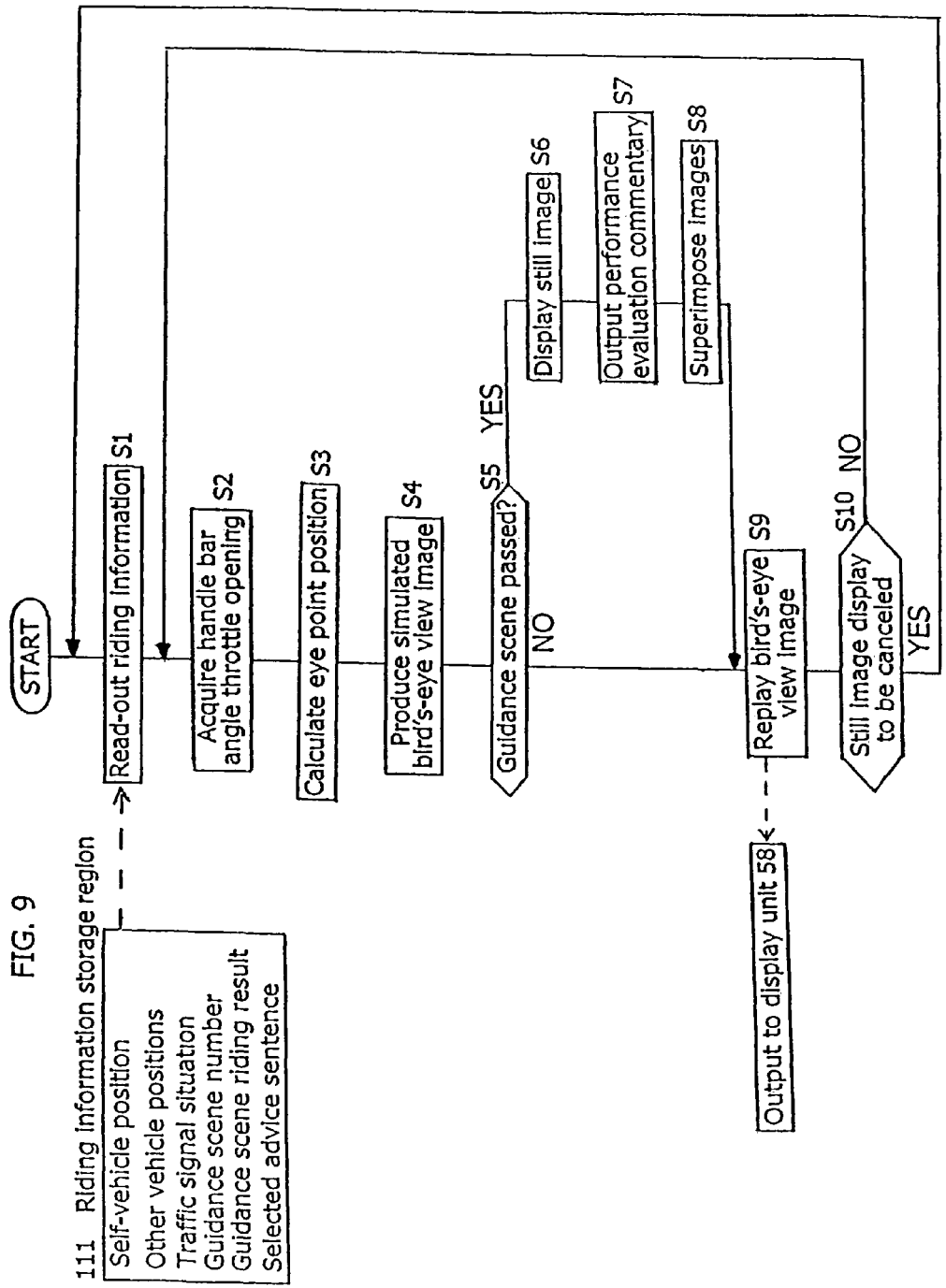
FIG. 9 is a flow chart for bird's eye view screen image production upon reproduction.

Subsequently, replay and review of recorded vehicle operation, after a simulated driving operation comes to an end, is described with reference to a flow chart of FIG. 9. It is to be noted that the process according to the flow chart of FIG. 9 is repeated after each 33 milliseconds of review time, and the image of the display unit 58 is updated after each 33 milliseconds. The CPU 100 executes the program of the flow chart.

After replay operation is started, in response to operation of a predetermined switch by the operator 30, contents stored in the driving information storage region 111 are transferred to the main memory 108 by the CPU 100, to establish a state wherein high speed reading out by the CPU 100 is possible.

Therefore, at step S1 in the case wherein, for example, the light control switch 94 is set to a normal speed, driving information which is data necessary for production of a bird's eye view screen image at the present point of time is read out. In particular, the student operator's virtual vehicle position, the other vehicle positions, a traffic signal situation, a driving situation number and so forth are read out.

Then at step S2, in order to determine the depression angle $\rho e$ of the bird's eye viewpoint, the throttle opening TH which is an operation amount of the throttle grip 86 operated by the operator 30 is detected from the throttle opening sensor 88. Further, in order to determine the rotational angle $\beta$ of the bird's eye viewpoint, the handle bar angle $\alpha s$ of the steering handle bar 78 operated by the operator 30 is detected from the handle bar angle sensor 90.

Then at step S3, the vantage point $E(Xe, Ye, Ze)$ and the depression angle $\rho e$ are calculated using the expressions (1) to (7) given hereinabove.

Then, based on results of the calculation, a replay bird's eye view screen image is produced by the CGI generation apparatus 112, perspective projection conversion is performed, and a resulting image is expanded in the image memory of the CPU 100 itself.

Then at step S5, the CPU 100 refers to the driving situation driving result in the driving information storage region 111 expanded in the main memory 108, to confirm whether or not the reproduction bird's eye view screen image is a screen image upon passage of one of the driving situations 131 to 138.

If the reproduction bird's eye view image is an image upon passage of one of the driving situations 131 to 138, that is, if the discrimination process at step S5 results in the affirmative discrimination, then the reproduction is placed into a temporarily paused state, and a display state of a still screen image is established at step S6.

Then at step S7, the student operator simulated driving result table 150 is referenced to select a performance evaluation commentary corresponding to the simulated student driving result of the pertaining driving situation. Then at step S8, the selected performance evaluation commentary is synthesized with the reproduction bird's eye view screen image produced at step S4 on the screen image memory by the CGI generation apparatus 112.

Then at step S9, a bird's eye view screen image for normal replay (in the case where the discrimination at step S5 is in the negative) or the bird's eye view screen image for still screen image display on which the performance evaluation commentary is synthesized is output to the display unit 58. At this time, the performance evaluation commentary is read aloud by voice and generated from the speaker 114.

In this manner, in the present embodiment, when the result of the discrimination process at step S5 is in the affirmative and a screen of a bird's eye view screen image with which a performance evaluation commentary is synthesized, that is, a driving situation, is displayed on the display unit 58, the reproduction process is compulsorily placed into a temporarily stopping state (still screen image displaying state) at step S6 taking it into consideration to make it possible for the screen to be observed well by the operator 30 and to make the confirmation by the operator 30 easy.

Then at next step S10, the process at step S1 for the reading out process for driving information at a next point of time (for production of a next reproduction bird's eye view screen image) is bypassed unless a still screen image display cancellation operation, that is, a cancellation operation by the starter switch 91, is performed, and the processes beginning with the detection process of the handle bar angle $\alpha s$ and the throttle opening TH at step S2 are repeated. Consequently, also in a still state, the bird's eye view vantage point can be changed over continuously and infinitely by operations of the steering handle bar 78 and the throttle grip 86. By this, an simulated student driving state can be confirmed from a desired bird's eye view vantage point at a desired driving situation. In this instance, it is otherwise possible to vary the vantage point position stepwise by setting arbitrary position displacement conditions in the program in advance. Where the vantage point position is varied stepwise, driving of the operator from the vantage point position can be observed efficiently.

It is to be noted that, if, upon passage of a driving situation (when the discrimination at step S5 is in the affirmative), temporary stopping reproduction at step S6 or reproduction at the normal speed with step S6 omitted may be performed but, when a driving situation is not passed (when the discrimination at step S5 is in the negative), fast feeding reproduction or skip reproduction is performed, then only the driving situation screen images can be confirmed in a concentrated manner and the total reproduction time can be reduced. In other words, guidance results for the driving situations 131 to 138 on the driving route 120 can be obtained in a short period of time.

Figure 10:
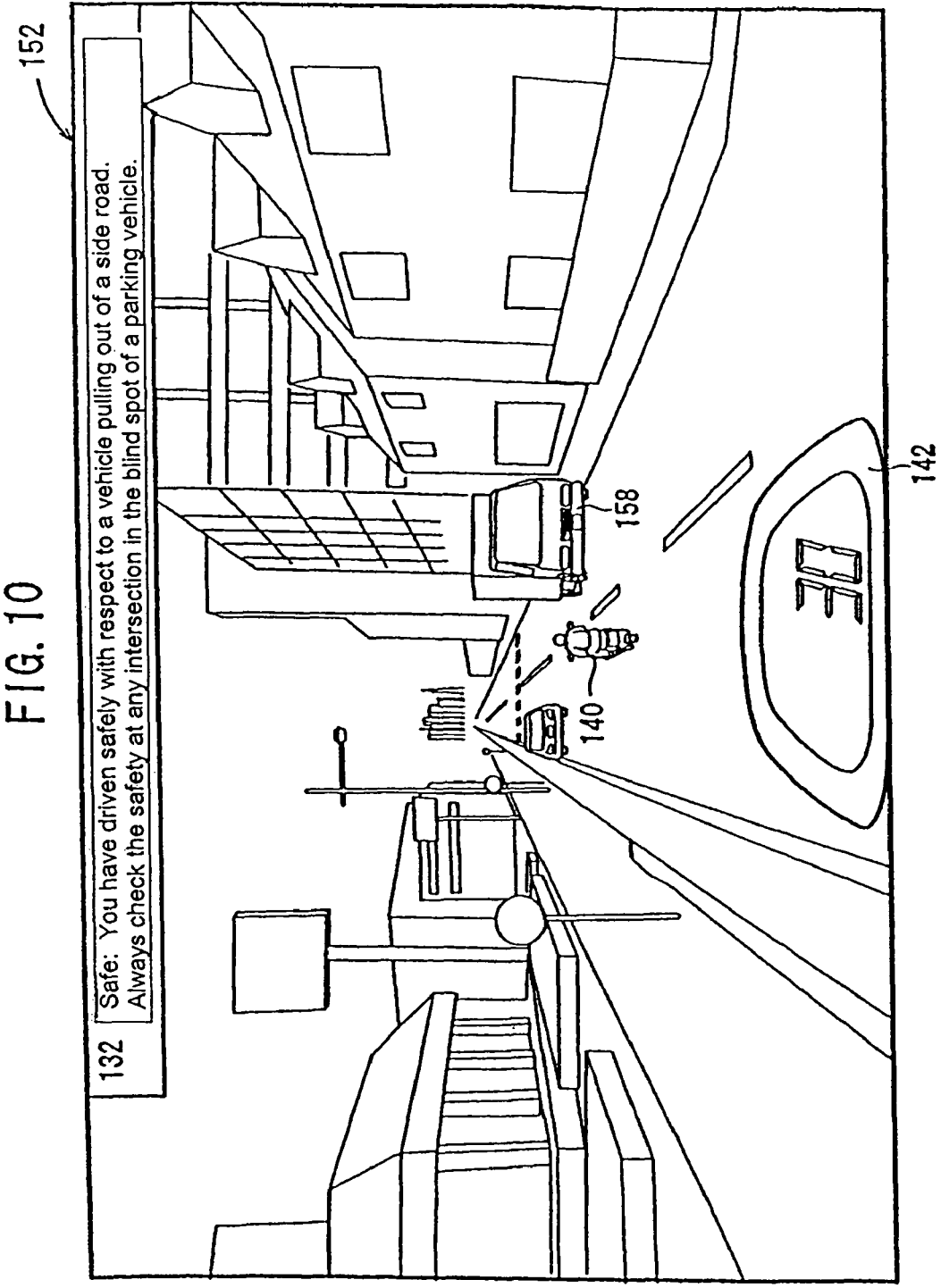
FIG. 10 is a schematic view showing an example of a reproduction screen which includes a performance evaluation commentary.

FIG. 10 shows a replay screen 152 wherein a performance evaluation commentary relating to a student operator's performance during the driving situation 132 (where the simulated student driving result is safe) and a bird's eye view screen image are synthesized with each other as an example. The replay screen 152 is a standard screen where the handle bar angle αs=0 degrees and the throttle opening TH=value 0.

Figure 11:
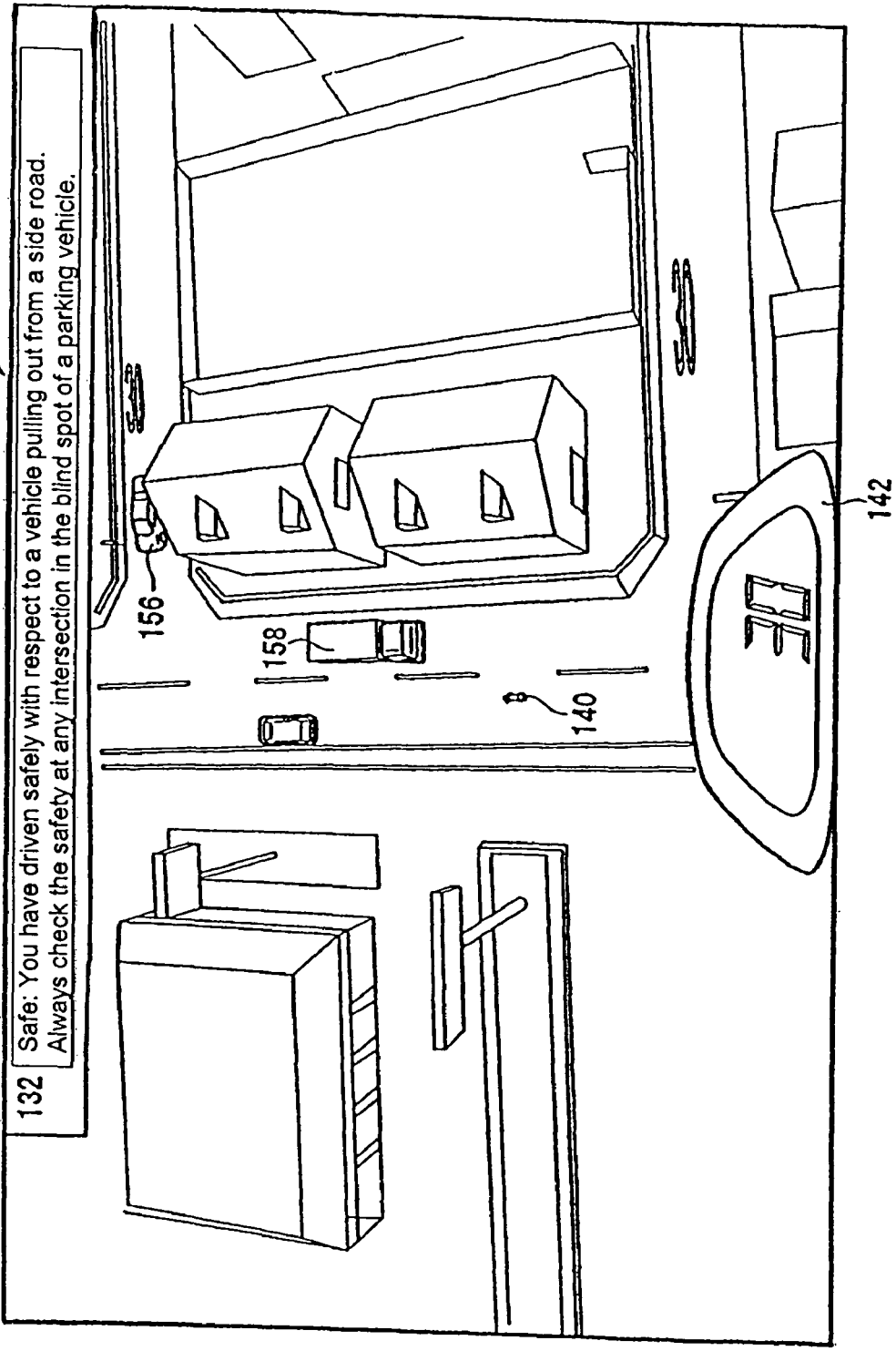
FIG. 11 is a schematic view of the reproduction screen of the example of FIG. 10 but shown with the bird's eye view vantage point varied.

FIG. 11 shows a replay screen 154 from another vantage point, at a higher position, when the throttle grip 86 is operated to increase the throttle opening TH than that on the replay screen 152 in a paused state of the standard screen. From the replay screen 154, it can be seen that a vehicle 156 which may jump out from a right side road is hidden behind a vehicle 158 running in the opposite direction, and therefore is positioned at the position of the occluded angle from the student operator's virtual vehicle 140, that is, from the driver of the two-wheeled virtual vehicle, who is the operator 30.

Figure 12:
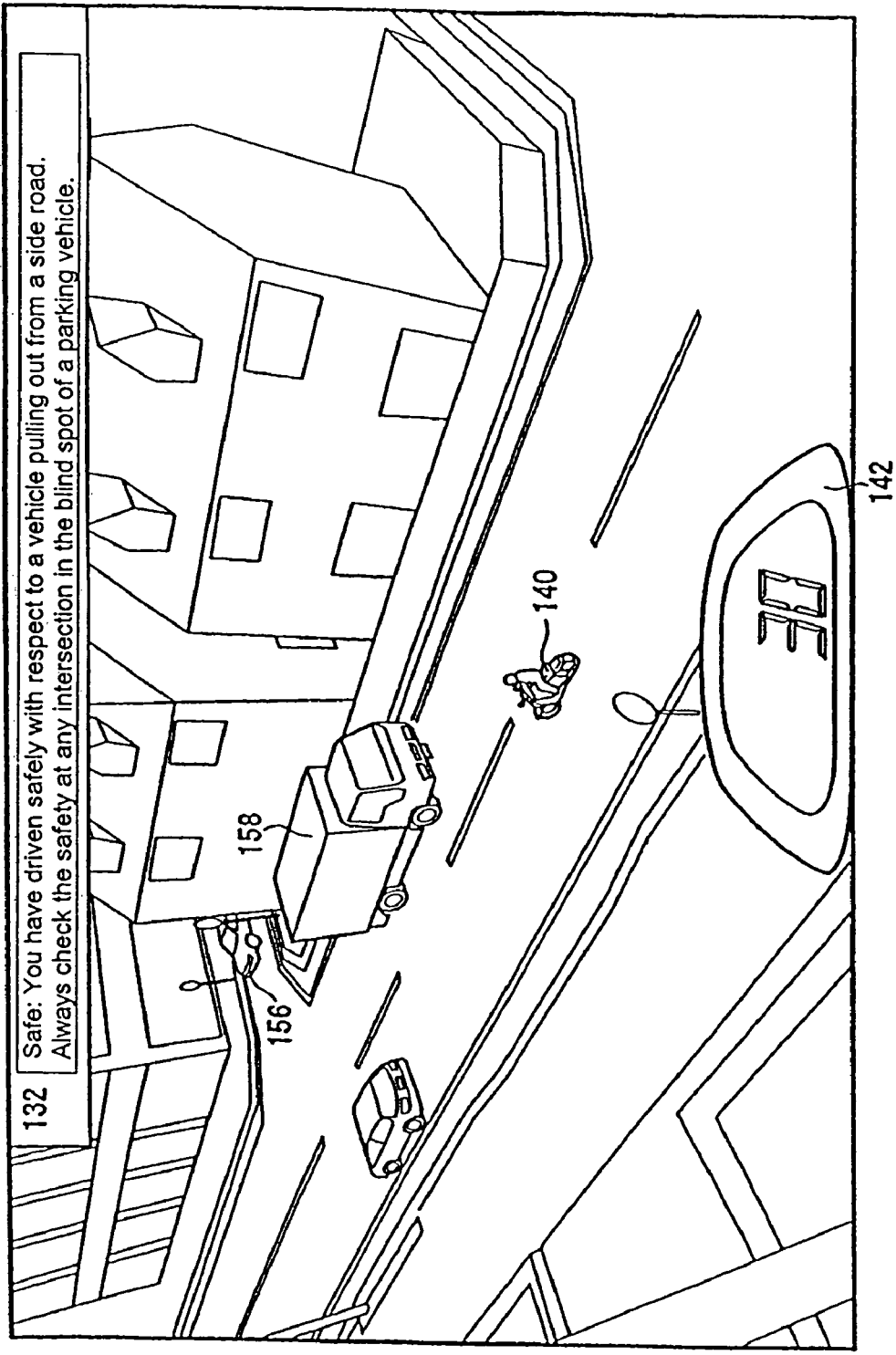
FIG. 12 is a schematic view of the reproduction screen of the example of FIG. 10 but shown with the bird's eye view vantage point varied.

A replay screen 160 obtained when the throttle grip 86 is returned a little and the steering handle bar 78 is turned in the rightward direction is shown in FIG. 12. Also from the reproduction screen 160, the jumping out vehicle 156 positioned at the occluded angle from the student operator's virtual vehicle 140 behind the vehicle 158 running in the opposite direction can be confirmed.

Figure 13:
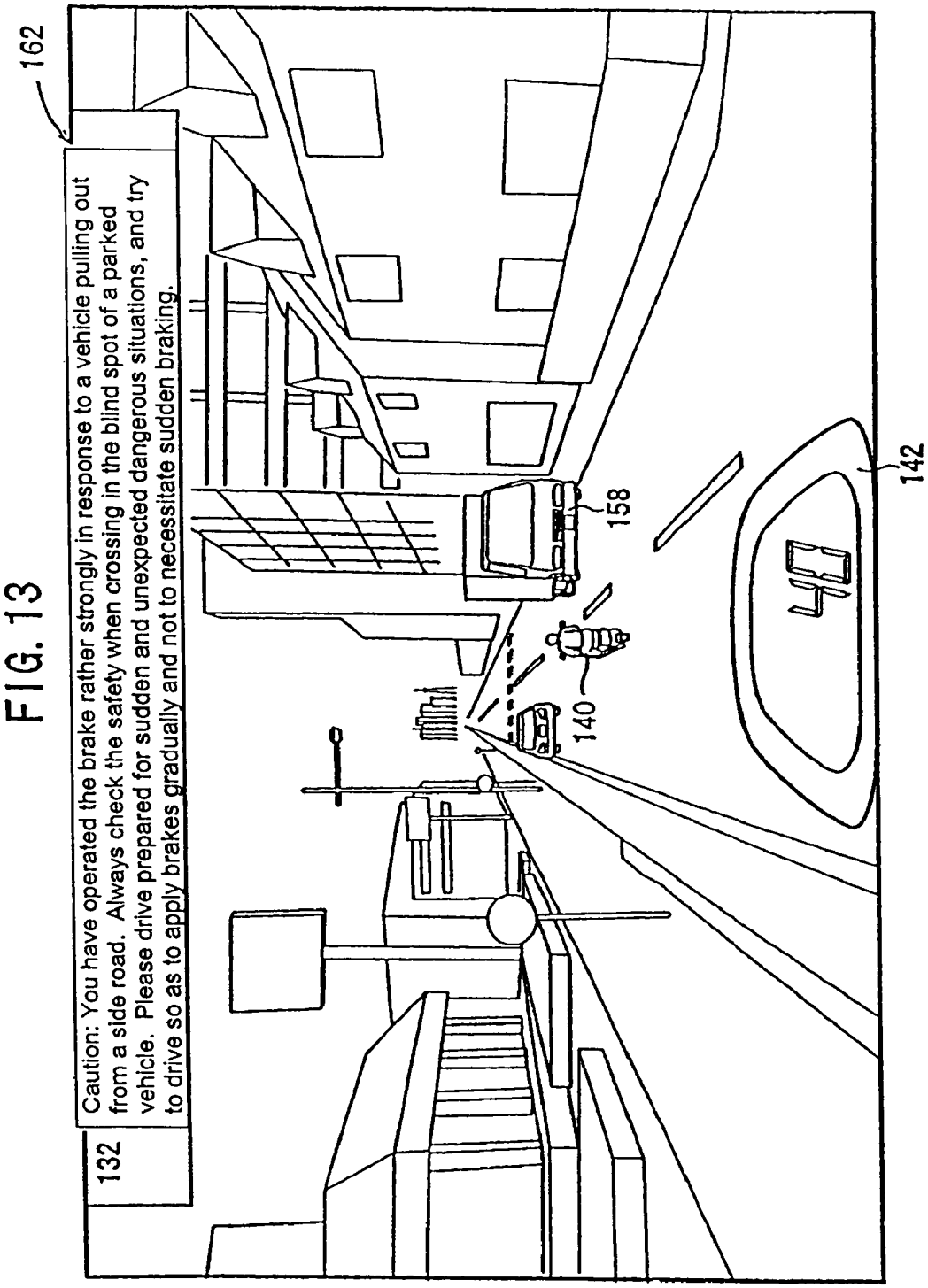
FIG. 13 is a plan view of a display as seen on the screen of the apparatus of FIG. 1 by an operator reviewing a completed driving cycle, and showing the superimposition of a simulated environment and a performance evaluation commentary commenting on the student's performance in that environment.
Figure 14:
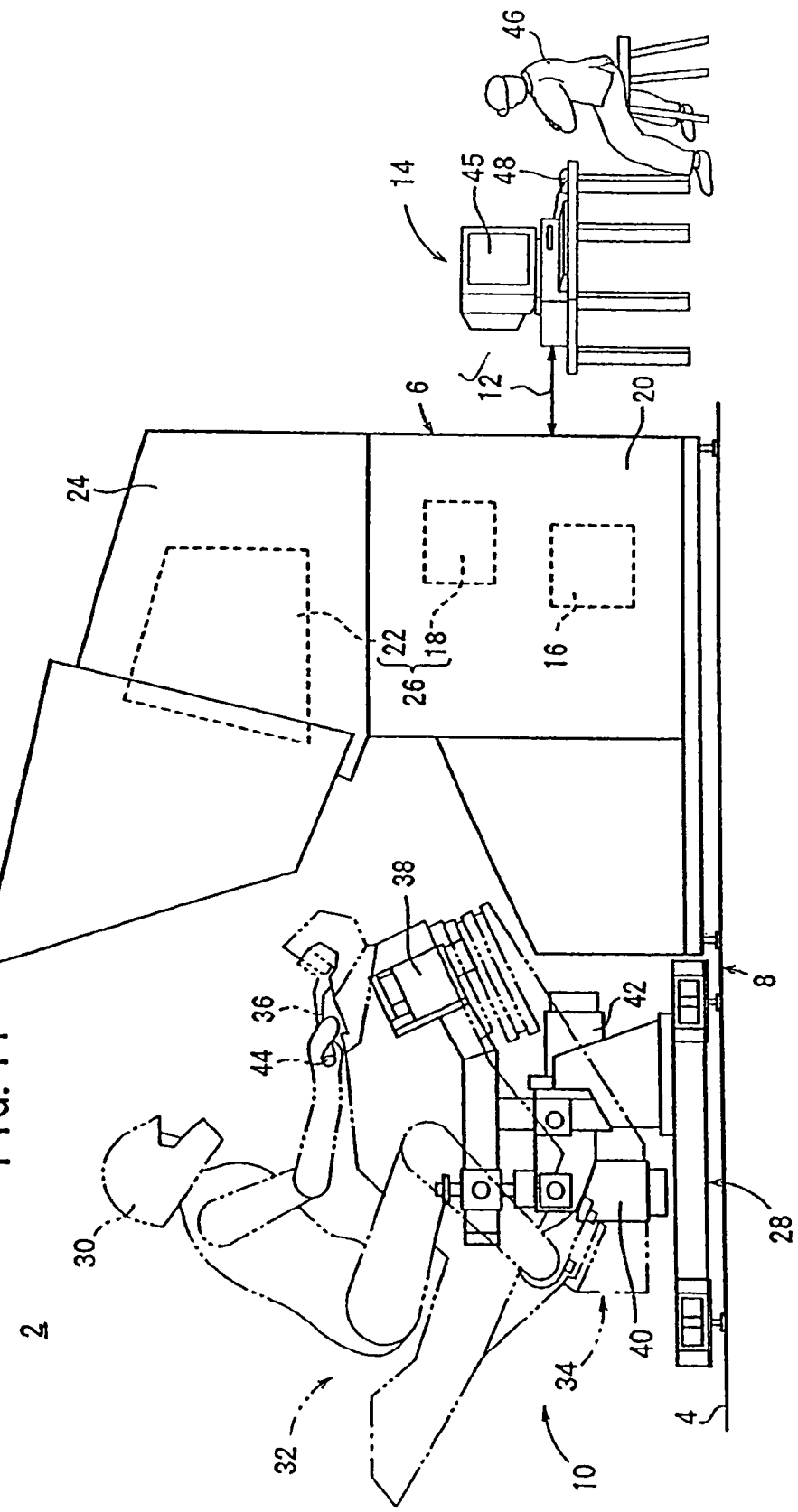
FIG. 14 is a side plan view of a prior art driving simulator, also showing an instructor's station for concurrently reviewing a student's performance in real time.

It is to be noted that FIG. 13 shows a reproduction screen 162 wherein a performance evaluation commentary relating to the driving situation 132 (when the simulated running result is unsafe) and a bird's eye view screen image are superimposed.

According to the embodiment described above, an interactive driving simulation apparatus 50 wherein a simulated operating environment is displayed as a screen image on a display unit 58 based on a driving operation of a simulated vehicle 52 by an operator 30 to allow the operator 30 to simulate the driving state of a two-wheeled vehicle and a driving situation is reproduced on the display unit 58 after the simulation comes to an end includes a CPU 100 for selecting a performance evaluation commentary from a simulated driving result by the driving operation of the operator 30 in a driving situation 131 to 138 determined in advance in a running route upon the simulation, and means (the CPU 100) for displaying the simulated operating environment and the performance evaluation commentary simultaneously, when the driving situation 131 to 138 is replayed on the display unit 58. Therefore, when the driving situation 131 to 138 is replayed on the display unit 58, the operator 30 can view the simulated operating environment and the performance evaluation commentary simultaneously. Accordingly, understanding of the operator 30 is facilitated, and a high degree of persuasion is obtained.

In this instance, where the means (CPU 100) for selecting a performance evaluation commentary selects only a scene (133 to 138) at which an unsafe action, such as "caution" or "accident", was performed from within the simulated running result by the driving operation of the operator 30 on the driving situation 131 to 138, and a performance evaluation commentary (refer to FIG. 8) and the means for displaying the simulated operating environment and the performance evaluation commentary simultaneously displays only the scene 133 to 138 at which the unsafe action was performed, such as the replay screen 162 shown in FIG. 13 upon replay on the display unit 58 while the other screens 131 and 132 and the driving screen image area skipped, the operator 30 can observe only a scene in which guidance is required. Consequently, the time required for guidance can be reduced.

In particular, according to the present embodiment, in the driving simulation apparatus 50 for a two-wheeled vehicle, upon simulated driving, a performance evaluation commentary corresponding to a simulated driving result by a driving operation of an operator 30 at a driving situation determined in advance in a driving route is selected and stored. Then, upon displaying of a replay screen image of the simulated driving on the display unit 58, when the driving situation determined in advance is passed, a simulated operating environment of the driving situation and the selected performance evaluation commentary are automatically displayed as a replay screen 154 simultaneously.

With the configuration described, the operator can be guided with a simple configuration without requiring a separate instructor apparatus formed from a personal computer as in the prior art. Therefore, the cost can be reduced, understanding of the operator 30 is facilitated, and a high degree of persuasion can be achieved. Naturally, even if an instructor is absent, the operator can be guided.

According to the present invention, the following advantages can be achieved:

When a driving situation is replayed on the display unit, a simulated operating environment and a performance evaluation commentary are displayed simultaneously. Consequently, the operator can confirm the screen image at the driving situation and the performance evaluation commentary simultaneously. Consequently, understanding of the operator is facilitated and a high degree of persuasion is obtained.

As a result, the necessity for an instruction apparatus with which an instructor gives guidance is eliminated, and the fabrication cost can be reduced. Also, even if an instructor who gives guidance is absent, relevant performance review comments can be selected and displayed, and the operator can enjoy the guidance efficiently.

The driving simulation apparatus of the present invention can be suitably used for a simulation for teaching traffic safety.

Although the present invention has been described herein with respect to a limited number of presently preferred embodiments, the foregoing description is intended to be illustrative, and not restrictive. Those skilled in the art will realize that many modifications of the preferred embodiment could be made which would be operable. All such modifications are within the scope of the claims, are intended to be within the scope and spirit of the invention.

Having thus, described the invention, what is claimed is:

1. An interactive driving simulation apparatus for teaching a student operator how to operate a two-wheeled vehicle on a simulated road, wherein said apparatus allows the student operator to simulate driving a two-wheeled vehicle, wherein said apparatus is operable to display a virtual environment as a screen image on a display unit based on a real-time driving routine of a simulated vehicle by the student operator, and wherein said apparatus is capable of recording a driving route sequence and replaying the driving route sequence on said display unit after the real-time driving routine is completed, said driving simulation apparatus comprising:

a selector which automatically selects performance evaluation comments from a stored plurality of comments based on operator input in a simulated driving route sequence, by a driving operation of the student operator in a driving route sequence determined in advance in a running route upon the driving simulation apparatus, wherein the display unit comprises a screen which simultaneously displays:

a simulated operating environment comprising simulated city driving including two-way traffic flow and intersections with side roads, and superimposed written text of performance evaluation comments when the driving route sequence is replayed on said display unit, wherein said performance evaluation comments are determined solely on the basis of input from the student operator as interpreted by an electronic controller, wherein said performance evaluation comments are provided to aid the student operator in assessing current skills so that the student operator can improve his or her driving skills, and wherein said performance evaluation comments are phrases which aid the student operator in improving his or her driving skills.

2. An interactive driving simulation apparatus according to claim 1, wherein:

said selector selects only a scene at which an unsafe action was performed by the student operator within the simulated driving route sequence, and matches performance evaluation comments corresponding to said scene at which an unsafe action was performed to the student operator's recorded performance, and wherein said display screen displays only the scene at which the unsafe action was performed and the performance evaluation comments.

3. An interactive driving simulation apparatus according to claim 1, further comprising:

a speaker for reading the performance evaluation commentary aloud upon reproduction thereof on said display unit.

4. An interactive driving simulation apparatus according to claim 1, wherein:

said display unit is operable to pause the replay and to display a still-screen image, in which the simulated operating environment and the performance evaluation commentary are simultaneously displayed thereon.

5. An interactive driving simulation apparatus according to claim 1, wherein:

said display unit reproduces a screen image recorded during a real-time simulation at a normal replay speed or temporarily pauses the replay and displays a still-screen image at a selected driving situation obtained from the driving route sequence, and performs fast-feeding replay or skipping replay at scenes other than the selected driving situation.

6. The driving simulation apparatus of claim 1, wherein the apparatus is operable without requiring input from any person other than the student operator during testing and replay.

7. An interactive driving simulation apparatus for teaching a student operator how to operate a two-wheeled vehicle on a simulated road which allows the student operator to simulate driving a two-wheeled vehicle, said driving simulation apparatus comprising:

an electromechanical simulator which interacts with the student operator during performance of a driving route sequence to teach the student operator how to operate a two-wheeled vehicle on a simulated road, said electromechanical simulator comprising a support frame, a handlebar operatively connected to the support frame, a pedal mechanism operatively connected to the support frame, and a plurality of sensors for measuring student input and for generating data corresponding to a specific performance by the student operator;

a recorder which records the specific performance data;

a processor which compares the specific performance data to a set of base line performance data and which automatically selects performance evaluation comments from a stored plurality of comments based on the comparison of the specific performance data with the base line performance data without requiring concurrent input from an outside source other than the student operator, and a display unit comprising a display screen which simultaneously displays:

a simulated operating environment comprising simulated city driving including two-way traffic flow and intersections with side roads, and superimposed written text of performance evaluation comments when the driving route sequence is replayed on said display unit for a testing situation in which the student operator's responses fail to perform at or above a specified level;

wherein a virtual environment is displayed as a screen image on the display unit based on a real-time driving route sequence of a simulated vehicle by the student operator, and wherein said apparatus is capable of recording a specific performance of a driving routine and replaying the specific performance on said display unit after the real-time driving routine is completed, wherein said performance evaluation comments are determined solely on the basis of input from the student operator as interpreted by an electronic controller, wherein said performance evaluation comments are provided to aid the student operator in assessing current skills so that the student operator can improve his or her driving skills, and wherein said performance evaluation comments are phrases which aid the student operator in improving his or her driving skills.

8. The driving simulation apparatus of claim 7, wherein selected input devices of the electromechanical simulator are operable to perform a first set of functions during performance of a real-time driving route sequence by a student operator, and wherein the selected input devices are operable to perform a second set of functions which is different from the first set of functions during playback of a recorded performance.

9. The driving simulation apparatus of claim 7, further comprising a speaker for generating an audible reproduction of the selected performance evaluation comments.

10. A method of training an operator to improve driving skills for operating a two-wheeled vehicle using a driving simulator, comprising the steps of:
  a) generating a prerecorded driving simulation course including a plurality of testing situations on a display screen of a driving simulator, said driving simulation course comprising simulated city driving including two-way traffic flow and intersections with side roads;
  b) recording the operator's real-time responses to a testing situation on a computer memory;
  c) comparing the operator's responses to prerecorded base line data; and
  d) replaying selected scenes from the simulation course on a display screen superimposed with selected written text of automatically generated performance evaluation comments from a stored plurality of comments corresponding to the operator's recorded responses, for a testing situation in which the operator's responses fail to perform at or above a specified level, wherein said performance evaluation comments are determined solely on the basis of input from the operator as interpreted by an electronic controller, wherein said performance evaluation comments are provided to aid the operator in assessing current skills so that the student operator can improve his or her driving skills, and wherein said performance evaluation comments are phrases which aid the operator in improving his or her driving skills.

11. The method of claim 10, wherein the method is performable without requiring input from any person other than the student operator during testing and replay.

12. The method of claim 10, further comprising a step of generating an audible performance evaluation commentary upon visual reproduction thereof on said display unit.

13. The method of claim 10, wherein the replay is paused to display a still-screen image when the simulated operating environment and the performance evaluation commentary are simultaneously displayed thereon.

14. An interactive driving simulation apparatus for teaching a student operator how to operate a two-wheeled vehicle on a simulated road which allows the student operator to simulate driving a two-wheeled vehicle, wherein
  said apparatus is operable to display a virtual environment as a screen image on a display unit, based on a real-time performance of a driving operation of a simulated vehicle by the student operator, and
  wherein said apparatus records a driving route sequence and replays the driving route sequence on said display unit after the real-time performance of a driving operation is completed,
  said driving simulation apparatus comprising:
  an electromechanical simulator with which the student operator interacts during the real-time performance of a driving operation, the electromechanical simulator including input devices actuated by the student operator during the real-time performance of a driving operation,
  a selector which automatically selects performance evaluation comments from a stored plurality of comments based on operator input in a simulated driving route sequence, by a driving operation of the student operator in a driving route sequence determined in advance in a running route upon the driving simulation apparatus, without requiring concurrent input from an outside source other than the student operator, and
  wherein the display unit comprises a screen which simultaneously displays both a simulated operating environment and superimposed written text of performance evaluation comments to the student operator when the driving route sequence is replayed on said display unit, said simulated operating environment comprising simulated city driving including two-way traffic flow and intersections with side roads,
  wherein selected input devices of the input devices of the electromechanical simulator are operable to perform a first set of functions during performance of a real-time driving route sequence by a student operator, and wherein the selected input devices are operable to perform a second set of functions which is different from the first set of functions during playback of a recorded performance,
  wherein said performance evaluation comments are provided to aid the student operator in assessing current skills so that the student operator can improve his or her driving skills, and
  wherein said performance evaluation comments are phrases which aid the student operator in improving his or her driving skills.

15. The interactive driving simulation apparatus of claim 14,
  wherein the interactive driving simulator apparatus further comprises a pre-stored selection of performance evaluation comments, and
  wherein the selector selects an appropriate one of the performance evaluation comments from the pre-stored plurality of performance evaluation comments based on the student operators performance during the driving route sequence.

* * * * *